United States Patent
Brown

(10) Patent No.: US 9,659,139 B2
(45) Date of Patent: May 23, 2017

(54) APPROACH FOR PERFORMING IMPROVED TIMING ANALYSIS WITH IMPROVED ACCURACY

(71) Applicant: NVIDIA CORPORATION, Santa Clara, CA (US)

(72) Inventor: David Lyndell Brown, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 5 days.

(21) Appl. No.: 14/744,012

(22) Filed: Jun. 18, 2015

(65) Prior Publication Data

US 2016/0371420 A1    Dec. 22, 2016

(51) Int. Cl.
  *G06F 17/50*    (2006.01)
(52) U.S. Cl.
  CPC ...... *G06F 17/5081* (2013.01); *G06F 17/5077* (2013.01); *G06F 17/5022* (2013.01); *G06F 17/5031* (2013.01); *G06F 17/5036* (2013.01); *G06F 17/5045* (2013.01); *G06F 17/5054* (2013.01); *G06F 2217/82* (2013.01)
(58) Field of Classification Search
  CPC ............ G06F 17/5031; G06F 17/5054; G06F 17/5077; G06F 17/5081; G06F 2217/82; G06F 17/5036; G06F 17/5022; G06F 17/5045

See application file for complete search history.

(56) References Cited

U.S. PATENT DOCUMENTS

| | | | | |
|---|---|---|---|---|
| 6,615,395 B1* | 9/2003 | Hathaway | ........... | G06F 17/5031 716/113 |
| 7,398,491 B2* | 7/2008 | Schaeffer | ............ | G06F 17/5036 716/113 |
| 7,454,731 B2* | 11/2008 | Oh | ...................... | G06F 17/5022 716/113 |
| 7,552,409 B2* | 6/2009 | Kucukcakar | ........ | G06F 17/5068 703/16 |

(Continued)

OTHER PUBLICATIONS

Chowdhary et al; How accurately can we model timing in a placement engine?; Year: 2005 ; Proceedings. 42nd Design Automation Conference, 2005; pp. 801-806.*

(Continued)

*Primary Examiner* — Helen Rossoshek
(74) *Attorney, Agent, or Firm* — Artegis Law Group, LLP

(57) ABSTRACT

One embodiment of the present invention includes a method for updating timing parameters after a circuit design change. The method includes, prior to the circuit design change, deriving a value for a first timing parameter based on a signoff timing analysis of a timing arc, and a value for a second timing parameter based on a quick timing analysis of the timing arc; and obtaining a first transition time based on the quick timing analysis. The method further includes, after the circuit design change, deriving a value for a third timing parameter based on the quick timing analysis, obtaining a second transition time based on the quick timing analysis, and deriving a fourth value for a fourth parameter based on the quick timing analysis, wherein the fourth parameter is based on the first, second, and third parameters and on the first and second transition times.

21 Claims, 12 Drawing Sheets

(56) References Cited

U.S. PATENT DOCUMENTS

| | | | | |
|---|---|---|---|---|
| 7,716,618 | B2* | 5/2010 | Ferrari | G06F 17/5045 716/115 |
| 7,823,098 | B1* | 10/2010 | Moon | G06F 17/5031 716/100 |
| 8,296,704 | B1* | 10/2012 | Kipper | G06F 17/5031 716/115 |
| 8,713,506 | B2* | 4/2014 | Zahn | G06F 17/505 716/120 |
| 8,745,561 | B1* | 6/2014 | Garg | G06F 17/5031 703/16 |
| 8,788,995 | B1* | 7/2014 | Kumar | G06F 17/5031 716/110 |
| 8,863,052 | B1* | 10/2014 | Dhuria | G06F 17/5036 716/108 |
| 8,875,082 | B1* | 10/2014 | Sircar | G06F 17/5031 716/110 |
| 2008/0244476 | A1* | 10/2008 | Fotakis | G06F 17/5022 716/132 |
| 2009/0281772 | A1* | 11/2009 | Jamann | G01R 31/31725 703/1 |
| 2011/0320997 | A1* | 12/2011 | Labib | G06F 17/5031 716/119 |
| 2015/0193569 | A1* | 7/2015 | Tam | G06F 17/5081 716/113 |

OTHER PUBLICATIONS

Kahng et al.; "Learning-based approximation of interconnect delay and slew in signoff timing tools"; Year: 2013; System Level Interconnect Prediction (SLIP), 2013 ACM/IEEE International Workshop on; pp. 1-8.*

Han et al.; "A deep learning methodology to proliferate golden signoff timing"; Year: 2014; 2014 Design, Automation & Test in Europe Conference & Exhibition (Date); pp. 1-6.*

Kahng et al.; "SI for free: machine learning of interconnect coupling delay and transition effects"; Year: 2015 ; System Level Interconnect Prediction (SLIP), 2015 ACM/IEEE International Workshop on; pp. 1-8.*

* cited by examiner

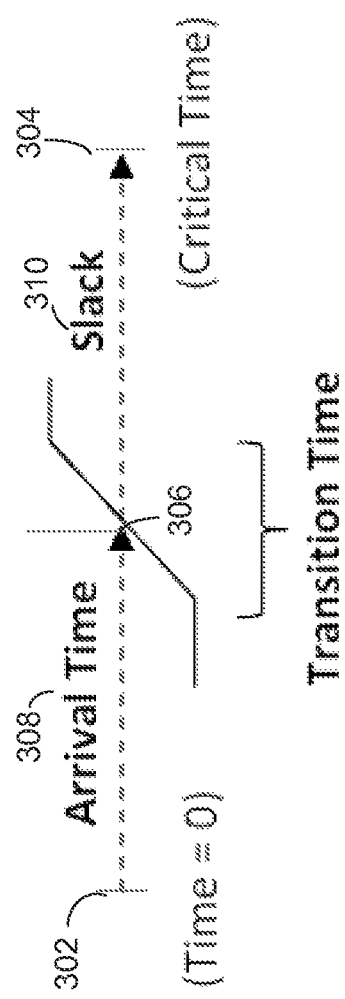

| gate/ wire | setup/ hold | rising/ falling | transition /arrival | QT larger/ QT smaller | reduce Tx Time / increase Tx Time | Exponent |
|---|---|---|---|---|---|---|
| w | s | r | t | > | - | Z1 |
| g | s | r | t | > | - | Z2 |
| g | h | f | a | < | + | Z3 |
| g | h | f | a | > | + | Z4 |
|  |  |  |  |  |  | Z5 |
|  |  |  |  |  |  | Z6 |
|  |  |  |  |  |  | ... |
|  |  |  |  |  |  | Z64 |

Figure 5A

APPROACH FOR PERFORMING IMPROVED TIMING ANALYSIS WITH IMPROVED ACCURACY

BACKGROUND OF THE INVENTION

Field of the Invention

Embodiments of the present invention relate generally to timing analysis for electronic circuit designs and, more specifically, to an approach for performing incremental timing analysis with improved accuracy.

Description of the Related Art

The physical design of very large scale integrated (VLSI) circuits involves the familiar steps of partitioning and chip planning, geometric placement of circuit components, clock tree synthesis, signal routing, and timing closure.

Timing closure refers to the process of satisfying timing constraints in the initial design and in subsequent changes to the initial design.

Timing constraints include setup constraints, which specify the amount of time that an input signal must be stable before a critical time point, and hold-time constraints, which specify the amount of time that a signal must be stable after the critical time point.

Typically, timing analyzers are used to determine whether a VLSI design meets such timing constraints, but such analyzers are either highly accurate and relatively slow or inaccurate and very fast. Often, a highly accurate timing analyzer takes hours or days to analyze a complex design, while a quick timing analyzer takes a relatively short time, such as seconds, but produces only approximate results or only executes on a very small portion of the design at any given time.

One drawback to the above approach is that a designer endures a long execution run of a signoff timing analyzer in order to obtain an accurate timing analysis. However, market conditions and revenue expectations often result in significant pressure to release new VLSI designs as soon as feasible.

Consequently, the long execution runs that are typical of signoff timing analyzers preclude investigating a large number of candidate circuit changes that can solve a timing problem or improve timing. As a result, performance of a new VLSI design may suffer, because the new VLSI design may be released before all candidate circuit changes are analyzed.

Accordingly, what is needed in the art is an improved approach for performing timing analysis for changes to VLSI designs.

SUMMARY OF THE INVENTION

One embodiment of the present invention sets forth a method for updating one or more timing parameters included in a plurality of timing parameters after a circuit design change. The method includes, prior to the circuit design change: (i) deriving a first value for a first timing parameter included in the plurality of timing parameters based on a signoff timing analysis of a timing arc; (ii) deriving a second value for a second timing parameter included in the plurality of timing parameters based on a quick timing analysis of the timing arc; and (iii) obtaining a first transition time based on the quick timing analysis. The method further includes, after the circuit design change, (i) deriving a third value for a third timing parameter included in the plurality of timing parameters based on the quick timing analysis, (ii) obtaining a second transition time based on the quick timing analysis, and (iii) deriving a fourth value for a fourth parameter included in the plurality of timing parameters based on the quick timing analysis, where the fourth parameter is based on the first parameter, the second parameter, the third parameter, the first transition time and the second transition time.

Other embodiments include, without limitation, a system that implements one or more aspects of the disclosed techniques, and a computer readable medium including instructions for performing one or more aspects of the disclosed techniques.

At least one advantage of the disclosed approaches is that the embodiments described herein provide a quick but accurate timing analysis of a change to a complex VLSI design. Such a timing analysis produces results as or almost as accurate as a signoff timing analyzer without requiring the lengthy time for a complete signoff analysis.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A depicts relationships in a static timing analysis between arrival time, transition time and slack for a timing arc, according to one embodiment of the present invention;

FIG. 5A illustrates a calibration table, which is used in the derivation of the exponent parameter Z in the calibration equation for a particular manufacturing process, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
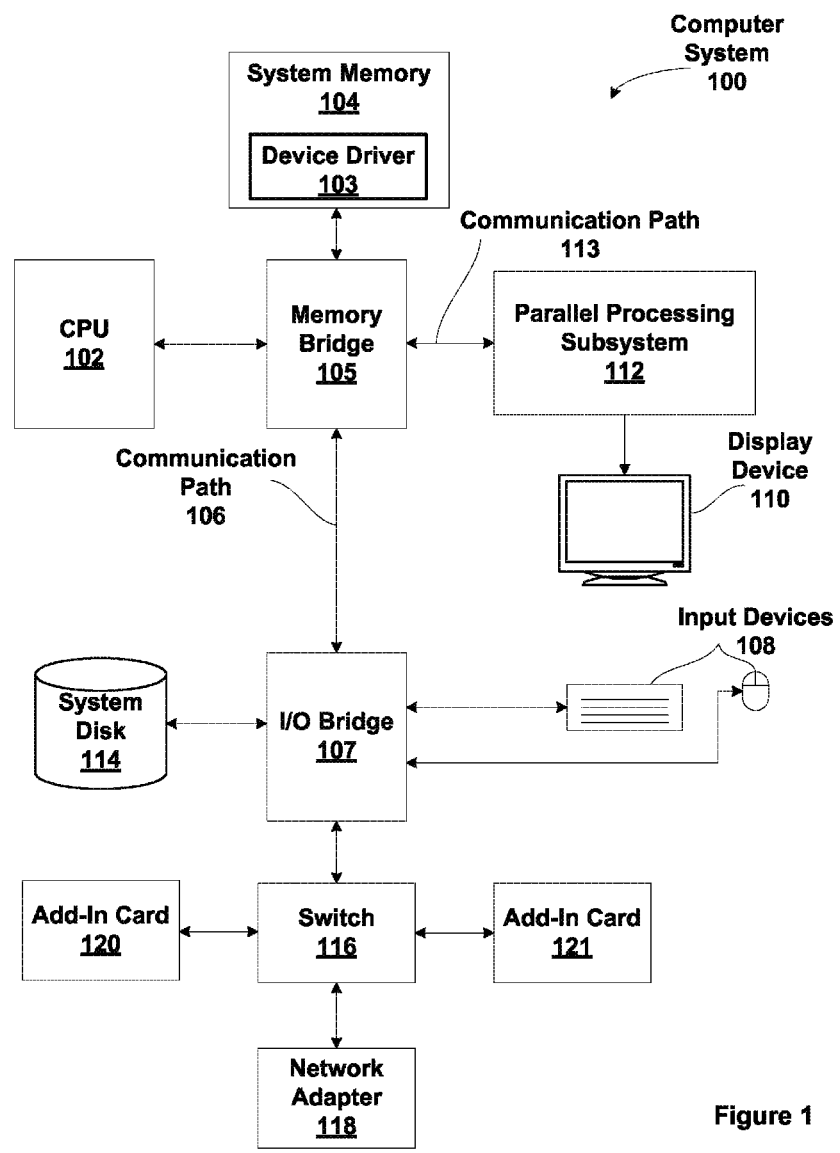
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 is part of a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
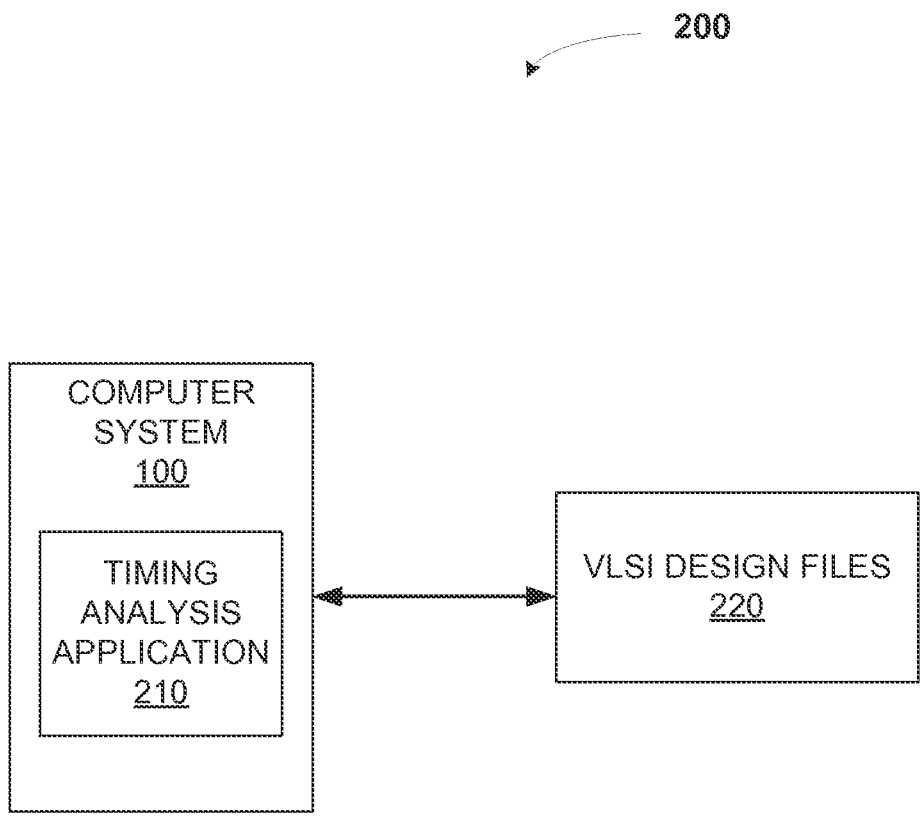
FIG. 2 illustrates a timing analysis system that includes the computer system of FIG. 1, according to one embodiment of the present invention.

FIG. 2 illustrates a timing analysis system 200 that includes the computer system 100 of FIG. 1, according to one embodiment of the present invention. As shown, the system 200 includes a computer system 100 and VLSI design files 220.

The computer system 100 is configured to execute a timing analysis application 210. In operation, the computer system 100, when executing the instructions in the timing analysis application 210, performs various timing analysis operations on the VLSI design files 220. In the context of this invention, the timing analysis application 210 may also be employed to analyze timing of a circuit change, by considering the timing impact of changes to gate sizes, placement, routing, electrical parasitics, and any other relevant factors. In addition, the timing analysis application 210 includes a mechanism for reporting timing parameters and performing additional computations required for this invention. Note, the timing analysis application 210 is typically an assembly of many different software components, and is not meant to necessarily imply a single software application.

The VLSI design files 220 include design information for a very large scale integrated (VLSI) circuit or other similar high density circuit. The VLSI design files 220 include electrical circuits that may be decomposed into logic "gates" (combinations of transistors that perform a logical function) and "wires" (connections between gates). The computer system 100, when executing the instructions in the timing analysis application 210, performs various analysis operations on the VLSI design files 220. These analysis operations are employed to determine that the VLSI circuit represented by the VLSI design files 220 is designed to function properly over a broad range of timing delays given variations in supply voltage, manufacturing process, temperature, surrounding electrical noise, and other parameters that are commonly encountered during operation of a VLSI circuit. For implementation of this disclosure, these analysis operations further include, without limitation, developing calibration equations for a particular manufacturing process, generating values for a calibration table based on the calibration equations, calculating initial error values and slack offsets prior to making a design change to a circuit included in the VLSI design files 220, evaluating the calibration equations after making the design change, and updating transition and slack time based on changes in endpoint constraints due to the design change. These analysis operations are further described herein.

Calibrating and Performing VLSI Design Incremental Timing Analysis with Improved Accuracy Systems such as the computer system 100 and timing analysis system 200 depicted in FIGS. 1-2 provide a sufficient computing platform for implementing one or more aspects of the present invention, as further described herein in conjunction with FIGS. 3A-8B. These aspects include, without limitation, performing timing analysis of an actual circuit design based on a quick timing analysis or flow (QTF) and a highly accurate signoff timing analysis or flow (STF), calibrating the QTF result after a circuit change to results from a signoff timing flow, generating parameters for an associated calibration table, determining error ratio values before a change to the actual circuit design and updating timing parameters related to wire arcs and gate arcs after a circuit design change.

The QTF uses estimated or partial placement and routing, typically ignores design rule check violations, uses a simplified parasitic model, only analyzes a portion of the design, and has a runtime on the order of 1 millisecond to 100 milliseconds for analysis of a proposed circuit change.

On the other hand, the STF uses full placement and routing, observes design rule checks, and employs a highly detailed parasitic analysis and a highly accurate calculation of cell and wire delay changes. Such an STF has a runtime on the order of 1 hour to 2 days.

Both STF and QTF perform a static timing analysis (STA), which propagates arrival times to the pins of every gate or cell in the design without considering the circuit functionality. STA assumes that every cell propagates a 0-1 or 1-0 transition from the cell inputs to the cell outputs.

FIG. 3A depicts relationships in a static timing analysis between arrival time, transition time, and slack for a timing arc, according to one embodiment of the present invention.

As shown, a signal transitions between a time=0 (starting) point 302 in the path to a critical time 304 in the path. The time between the starting point 302 and the middle of a rising signal transition 306 is the arrival time 308 and the time remaining in the critical time period is the slack time 310, also referred to herein as slack. Likewise, a similar analogous figure applies in the case of a falling transition instead of rising transition. Thus, six different parameters can be defined for a circuit path, rising transition time, falling transition time, rising arrival time, falling arrival time, rising slack time and falling slack time. When a STF is performed on a circuit design, all six parameters for every pin (all input and outputs of all gates) in the design are recorded in a STF-generated timing table, as further described herein.

Figure 3B:
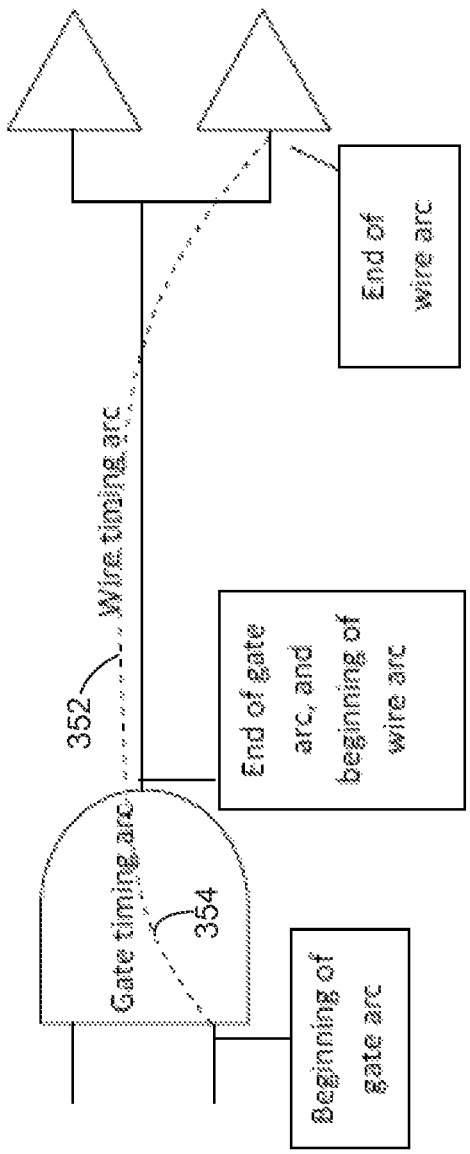
FIG. 3B illustrates a circuit path in a portion of a circuit design to which timing parameters apply, according to one embodiment of the present invention.

FIG. 3B illustrates a circuit path in a portion of a circuit design to which timing parameters apply, according to one embodiment of the present invention. As shown, these paths include a wire timing arc 352 and a gate timing arc 354, which together comprise a complete timing arc for the circuit path. The wire timing arc 352 represents the time between a driver output to a load input. The gate timing arc 354 represents the time between a gate input and the gate output.

VLSI electrical circuits may be decomposed into logic "gates" (combinations of transistors that perform a logical function) and "wires" (connections between gates). Similarly, timing analysis of an electrical circuit can be decomposed into "timing arcs". A "gate timing arc" describes electrical current propagating from an input of a logic gate to the output of the logic. For gate timing arcs, the "beginning of the arc" is at the gate's input, and the "end of the arc" is at the gate's output. A "wire timing arc" describes electrical current propagating from a gate sending a signal (the "driver") to a gate receiving a signal (the "load") via a connection between the gates. For wire timing arcs, the "beginning of the arc" is at the output of a gate sending a signal, and the "end of the arc" is at the input of a gate receiving the signal. Thus, the wire arc is from "driving pins" to "load pins".

The parameters used to describe a timing arc include the beginning and ending transition times (how quickly the voltage switches from a low to a high value, or vice versa at each side of the arc), the beginning and ending arrival times (at what times a switching voltage crosses through its midpoint value, relative to a globally defined zero time value at each side of the arc), and the slack time (at what time does the voltage value reach its midpoint at the end of the arc relative to the critical time required for the circuit to function as intended.

Environmental conditions create a broad variation in timing parameters. To assure correctness in the design under these broad variations, timing arcs are analyzed for both setup and hold timing.

Due to variations in supply voltage, manufacturing process, temperature, surrounding electrical noise, and other parameters, a circuit may have a broad range of timing delays. Thus, timing arcs are normally analyzed separately for setup timing (ensuring that the circuit is fast enough to meet performance goals) and hold timing (ensuring that no circuit elements are so fast that they cause data to be unstable or registered in an incorrect clock cycle).

Furthermore, timing arcs are further subdivided depending on whether the end-of-arc voltage is rising or falling, as the setup and hold timing may differ for rising transitions versus falling transitions. Note, for a gate timing arc, some arcs such as the select-to-output arc for a mux may have both rising and falling input transitions leading to both rising and falling output transitions. Such arcs are called "non-unate", and unless otherwise stated, a "rising edge timing arc" refers to voltage rising at the output as triggered by whichever input edge produces the most critical timing. These definitions are analogous for falling edge timing arcs.

Generating a quick and accurate timing analysis depends on developing a way of correcting the QTF to be closer or equal to the STF, without incurring significant performance reduction. This result is accomplished with a calibration equation.

To develop such a calibration equation in one embodiment, the STF and QTF for a given manufacturing process may be compared to characterize the differences (errors) between STF and QTF results before a particular type of circuit change and after the circuit change. Types of circuit changes include, without limitation, resizing logic gates, moving logic gates, adding and removing buffers along wires, and resizing and moving wires.

Timing parameters for STF and QTF before the circuit change are ($P_{S1}$, $P_{Q1}$), respectively, where P represents any one of the timing parameters discussed above. The timing parameters for STF and QTF after the circuit change are ($P_{S2}$, $P_{Q2}$), respectively. The difference ($P_{S1}-P_{Q1}$) represents the error between the STF and QTF before the circuit change and the difference ($P_{S2}-P_{Q2}$) represents the error between the STF and the QTF after the circuit change. Likewise, $T_{Q2}$ represents the transition time after the change and $T_{Q1}$ represents the transition time before the change, both as computed by the QTF. The calibration equation relates the ratio of these errors (called the "error value ratio") to a ratio of transition time after the change $T_{Q2}$ and transition time before the change $T_{Q1}$ (called the "quick transition ratio"). This calibration equation is given by Equation 1 below:

$$(P_{S2}-P_{Q2})/(P_{S1}-P_{Q1})=(T_{Q2}/T_{Q1})^Z \quad \text{Eqn. 1}$$

In this equation, Z is an empirically derived parameter that optimally relates the ratio of errors to the ratio of transition times for a given manufacturing process. This equation can be solved for $P_{S2}$, which is the sought for QTF corrected result. In other words, solving the equation for $P_{S2}$ yields the calibrated value for the QTF, $P_{Q2C}$, after the change, without requiring another execution run of STF after the change, because all of the remaining values are available without a subsequent STF execution run. Solving for $P_{Q2C}$ results in Equation 2 below:

$$P_{Q2C}=P_{Q2}+(T_{Q2}/T_{Q1})^Z*(P_{S1}-P_{Q1}) \quad \text{Eqn. 2}$$

Values of Z for certain categories of changes are stored in a calibration table, which is discussed below.

Figure 4:
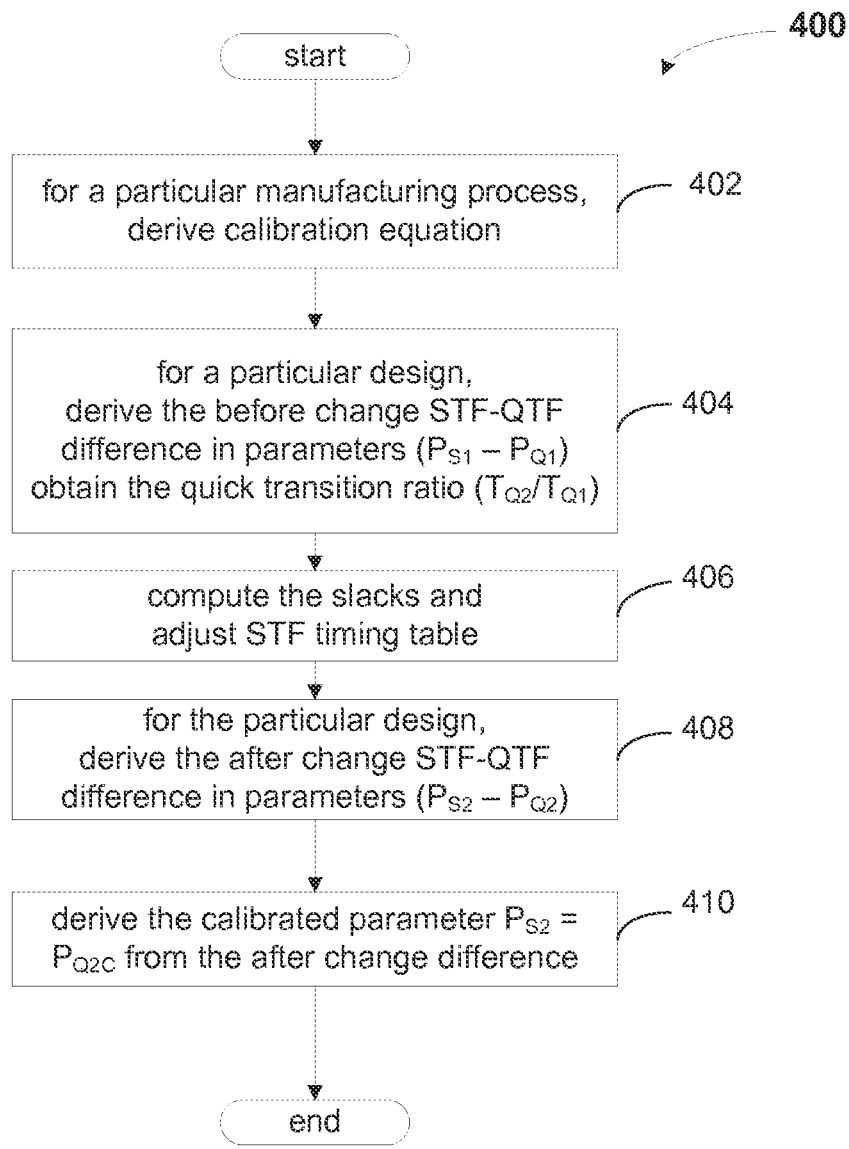
FIG. 4 is a flow diagram of method steps for determining parameters for calibrating a quick timing flow (QTF) to a signoff timing flow (STF) for various types of circuit changes, according to one embodiment of the present invention.

FIG. 4 is a flow diagram of method steps for determining parameters for calibrating a quick timing flow (QTF) to a signoff timing flow (STF) for various types of circuit changes, according to one embodiment of the present invention. Although the method steps are described in conjunction with the systems of FIGS. 1-3B, persons skilled in the art will understand that any system configured to perform the method steps, in any order, is within the scope of the present invention.

As shown, a method 400 begins at step 402, where a timing analysis application 210 fits a calibration equation, described above, to a particular manufacturing process. At step 404, for a particular sample design and before a change to the design, timing analysis application 210 determines an error ($P_{S1}-P_{Q1}$), where $P_{S1}$ is obtained from the STF timing table and $P_{Q1}$ is obtained from the QTF analysis. The quick transition ratio ($T_{Q2}/T_{Q1}$) is also obtained, based on the uncalibrated transition time after the change and the uncalibrated transition time before the change, as determined by QTF. At step 406, timing analysis application 210 computes the slacks and adjusts the STF timing table based on the computed slacks. At step 408, timing analysis application 210 determines the after-change error ($P_{S2}-P_{Q2}$) and derives the desired calibration parameter to mostly closely achieve $P_{S2}=P_{Q2C}$. The method 400 then terminates.

FIG. 5A illustrates a calibration table 502, which is used in the derivation of the exponent parameter Z 504 in the calibration equation for a particular manufacturing process, according to one embodiment of the present invention. As shown, the calibration table 502 indicates that 64 Z parameters are derived, one for each possible combination of change and analysis category. The categories include a gate/wire category 506, a setup/hold category 508, a rising/falling category 510, a transition/arrival category, a QTF larger/smaller than STF category 514, and a reduced/increased transition time category 516. In some embodiments, the rising/falling 510 column is not included as a separate category, thereby reducing the table by half.

Figure 5B:
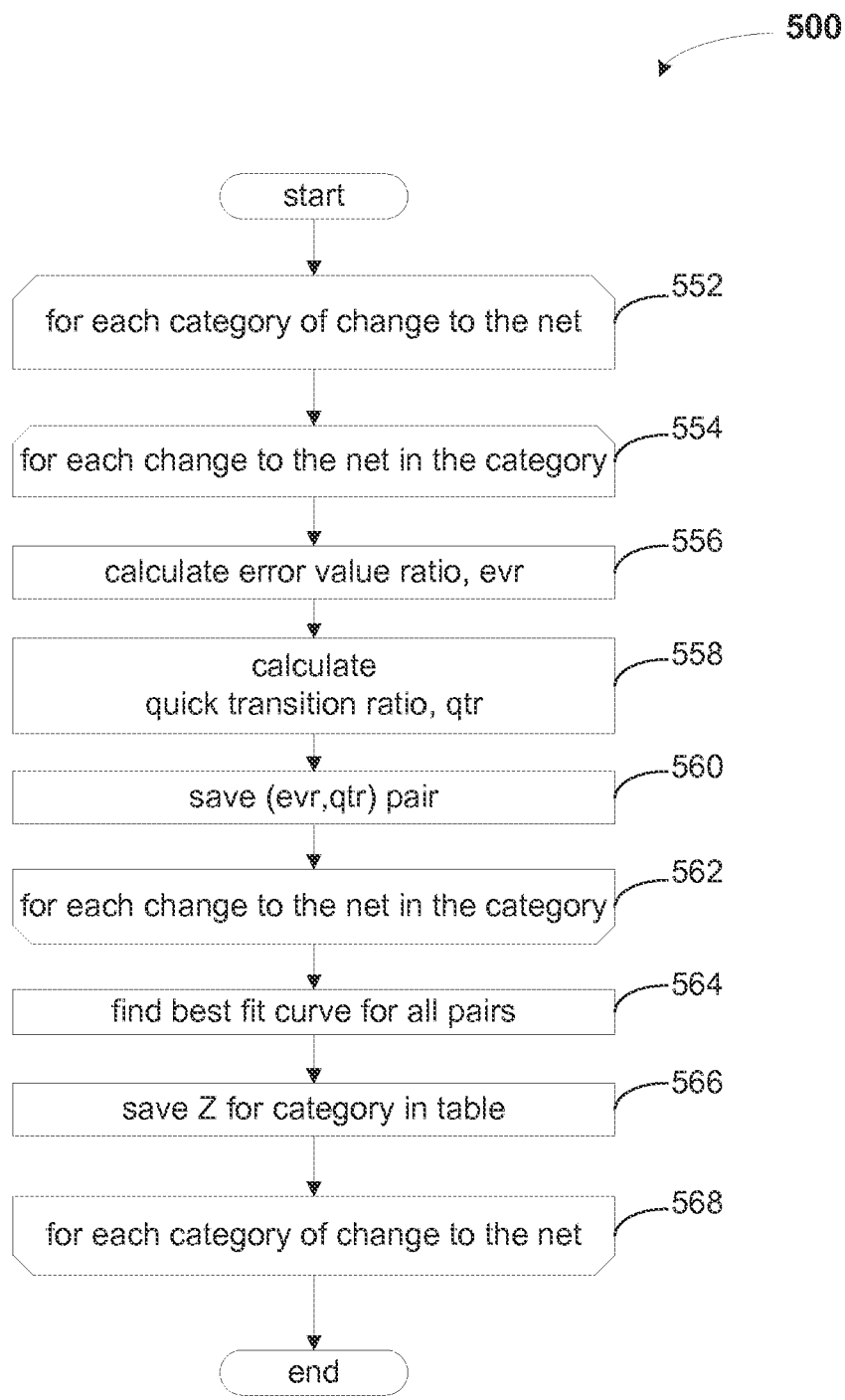
FIG. 5B is a flow diagram of method steps for generating parameters in the calibration table, according to one embodiment of the present invention.
Figure 5C:
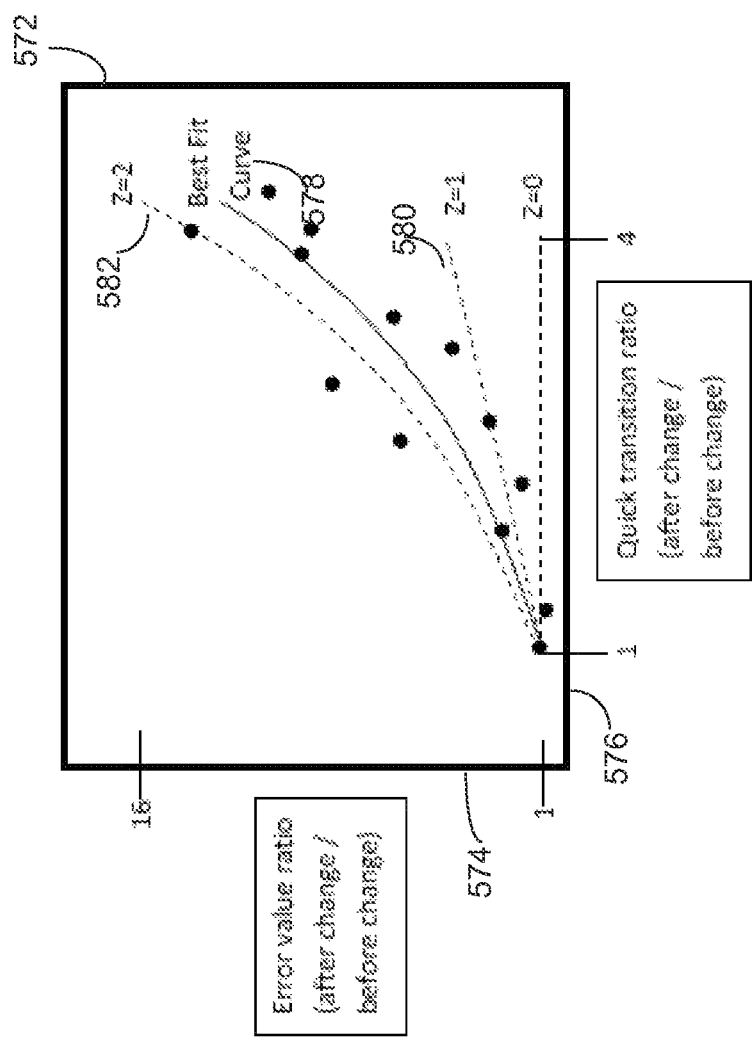
FIG. 5C depicts an example best fit curve for a Z value in the calibration table, according to one embodiment of the present invention.

FIG. 5B is a flow diagram of method steps for generating parameters for the calibration table 502, according to one embodiment of the present invention. Although the method steps are described in conjunction with the systems of FIGS. 1-3B, persons skilled in the art will understand that any system configured to perform the method steps, in any order, is within the scope of the present invention. First, steps 552 and 568 indicate that the intervening steps are repeated for each sample circuit change to a net that affects a change in at least one of the categories in the calibration table 502. As described above, a circuit change can include resizing logic gates, moving logic gates, adding and removing buffers along wires, and resizing or moving wires. For each steps 554 and 562 indicate that the intervening steps are repeated for different values of the error values and quick transition ratios in the same category. At step 556, timing analysis application 210 computes the error value ratio (evr) in the calibration equation. At step 558, timing analysis application 210 computes the quick transition ratio (evr) in the calibration equation. At step 560, timing analysis application 210 saves each pair of values (evr, qtr). The result is a set of pairs of error ratio values and quick transition ratios. At step 564, timing analysis application 210 derives a closest fitting function for the set of pairs, as illustrated in FIG. 5C. At step 566, timing analysis application 210 saves the final result in the calibration table 502 for the category. When the process completes, 64 optimal Z parameters, one for each category in the calibration table 502, are available, assuming that rising and falling Z values are separately considered. In some embodiments, rising and falling are not distinguished, resulting in a calibration table 502 with 32 optimal Z parameters. In some embodiments, Z values are computed separately or jointly for different types of changes and/or process corners, resulting in larger or smaller tables, respectively.

FIG. 5C depicts an example best-fit curve for a Z value in the calibration table 502, according to one embodiment of the present invention. As shown, a family of curves 572 is derived, where a number of error value ratio values (on the vertical axis 574) for a particular category are plotted against a number of the corresponding quick transition ratio values (on the horizontal axis 576), and a best-fit curve 578 is derived. The exponent for the best fitting curve gives the value of Z. For example, a curve 580 with a Z value of 1 indicates that the error value ratio is linear with respect to the quick transition ratio. A curve with a Z value of greater than 1, such as curve 582 with a Z value of 2 indicates that the error value ratio is exponential in relation to the quick transition ratio. As shown in this particular example, the best fit curve 578 has a Z value greater than 1 and less than 2.

A process for determining the error ratio values in an actual design is next described. In general, this process should be performed before performing a change to a circuit that is to be analyzed using the QTF. First, the process computes the error ratio values for gate and wire timing arcs prior to a design change, as now described. The process records the QTF-calculated transition times for each pin, and computes arrival-based slack times, using a slack equation.

Figure 6:
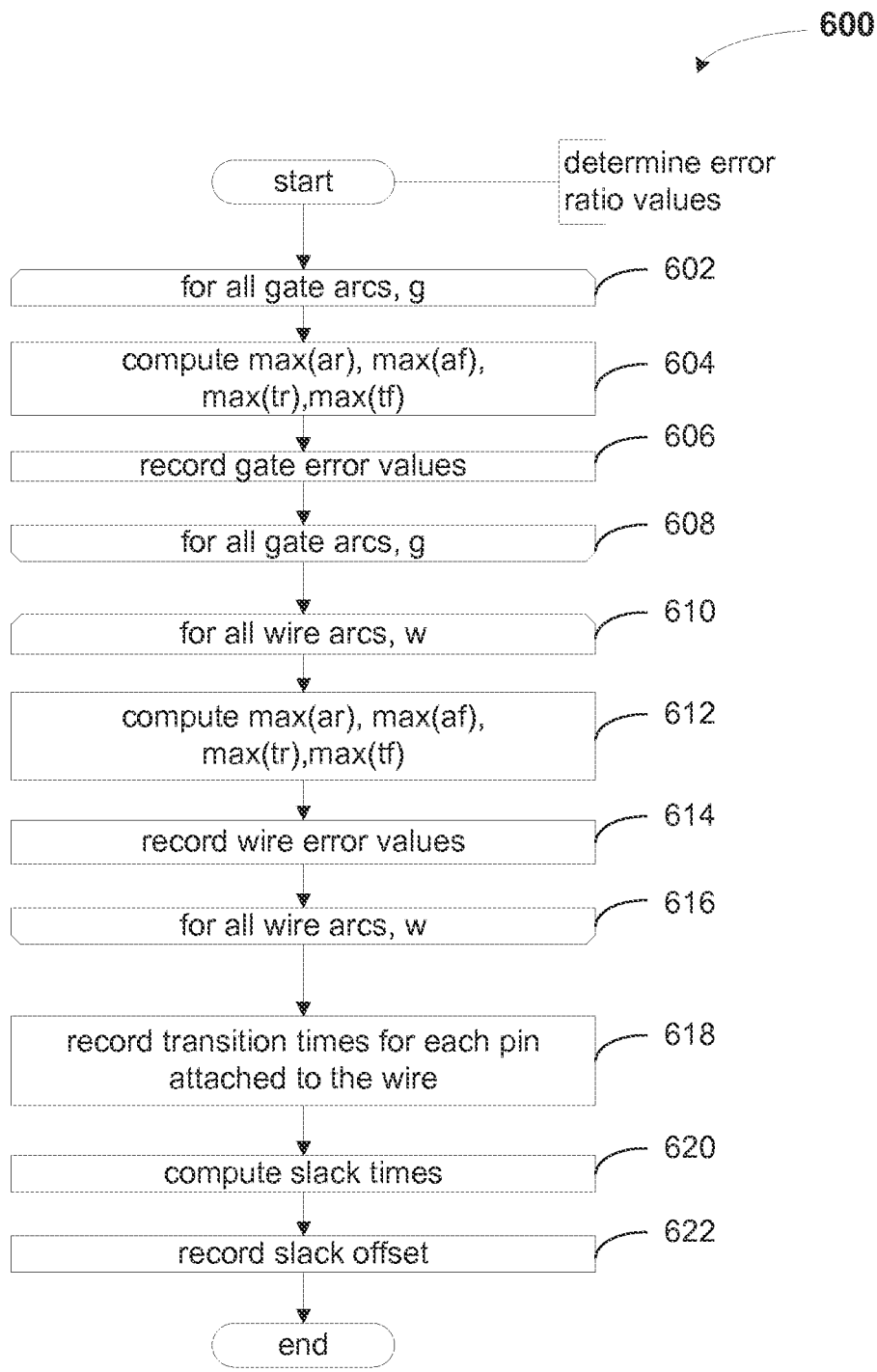
FIG. 6 is a flow diagram of method steps for determining the error ratio values before a change to an actual design, according to one embodiment of the present invention.

FIG. 6 is a flow diagram of method steps for determining the error ratio values before a change to an actual design, according to one embodiment of the present invention. Although the method steps are described in conjunction with the systems of FIGS. 1-5C, persons skilled in the art will understand that any system configured to perform the method steps, in any order, is within the scope of the present invention.

As shown at steps 602 and 608, the intervening steps 604-606 are repeated for each gate arc. At step 604, timing analysis application 210 computes the worst case rising arrival time (max(ar)) and falling arrival time(max(af)), and worst case rising transition time (max(tr)) and falling transition time (max(tf). At step 606, timing analysis application 210 computes the gate error values $E_{QS}$ based on the worst arrival times and transition times. That is, the process computes the ($P_{S1}$–$P_{Q1}$) error value, where P is an arrival time or a transition time for each of the gate arcs. As shown at steps 610 and 616, the intervening steps 612-614 are repeated for each wire arc. At step 612, timing analysis application 210 computes the worst arrival times, both rising and falling, and transition times, both rising and falling. At step 614, timing analysis application 210 computes and records the ($P_{S1}$–$P_{Q1}$) wire error value, where P is an arrival time or transition time for each of the wire arcs. At step 618, timing analysis application 210 records the transition times for each pin attached to a wire arc. At step 620, for gates with more than one input, timing analysis application 210 computes the arrival-based slack time for each input on a gate arc or wire arc in accordance with the slack equation, which relates the arrival error values to the slack offset values. This slack equation is given by Equation 3 below:

$$S_{QS}=(S_{SI}-S_{SO})-D*(A_{SO}-(A_{SI}+G_{IO}+E_{QS}))) \quad \text{Eqn. 3}$$

where $S_{QS}$ is the slack offset for the input pin. $S_{SI}$ and $S_{SO}$ are the slacks at the input and output of the gate arc, both from the STF-generated timing table. Similarly, $A_{SI}$ and $A_{SO}$ are the arrival times at the input and output of the gate arc, both from the STF-generated timing table. $G_{IO}$ is the gate arc delay as estimated by the QTF. $E_{QS}$ is the gate arc arrival error value computed above, and D=1 for setup timing checks and –1 for hold timing checks. The term ($A_{SI}$+$G_{IO}$+$E_{QS}$) can be viewed as the calibrated arrival time at the output, solely due to the input being evaluated (i.e. if the input were the only active pin), while $A_{SO}$ is the arrival time at the output, considering all inputs. Thus, the latter part of the equation is comparing the difference in the output arrival between the worst gate arc and the gate arc being evaluated. Similarly, ($S_{SI}$–$S_{SO}$) is the difference in slack between the gate arc being evaluated and the worst gate arc, since the worst gate arc would determine the output slack. The comparison between slack differences and arrival differences, for non-worst case versus worst case arcs, gives a measure of how much the slack difference for each non-worst case arc is offset from its arrival difference, with each difference being relative to the worst case arc. For instance, in many setup timing paths, if a particular input arrives earlier than the worst input, then its setup slack would be expected to be better by the same amount that its arrival was earlier. If that was the case, then the computed slack offset would be zero. However, the input may receive signals from a part of the circuit with more uncertainty in timing parameters and thus have less slack than would be expected if only arrival times were considered, since the greater uncertainty would require more margin in the arrival time to ensure reliable chip operation. This scenario would result in a negative slack offset. At step 622, timing analysis application 210 records the slack offset. Thus, the goal of step 622 is to determine the cases in which slack does not vary directly with the arrival time. This condition commonly occurs due to differences in uncertainty or other special timing requirements amongst input pins. The method 600 then terminates.

Figure 7:
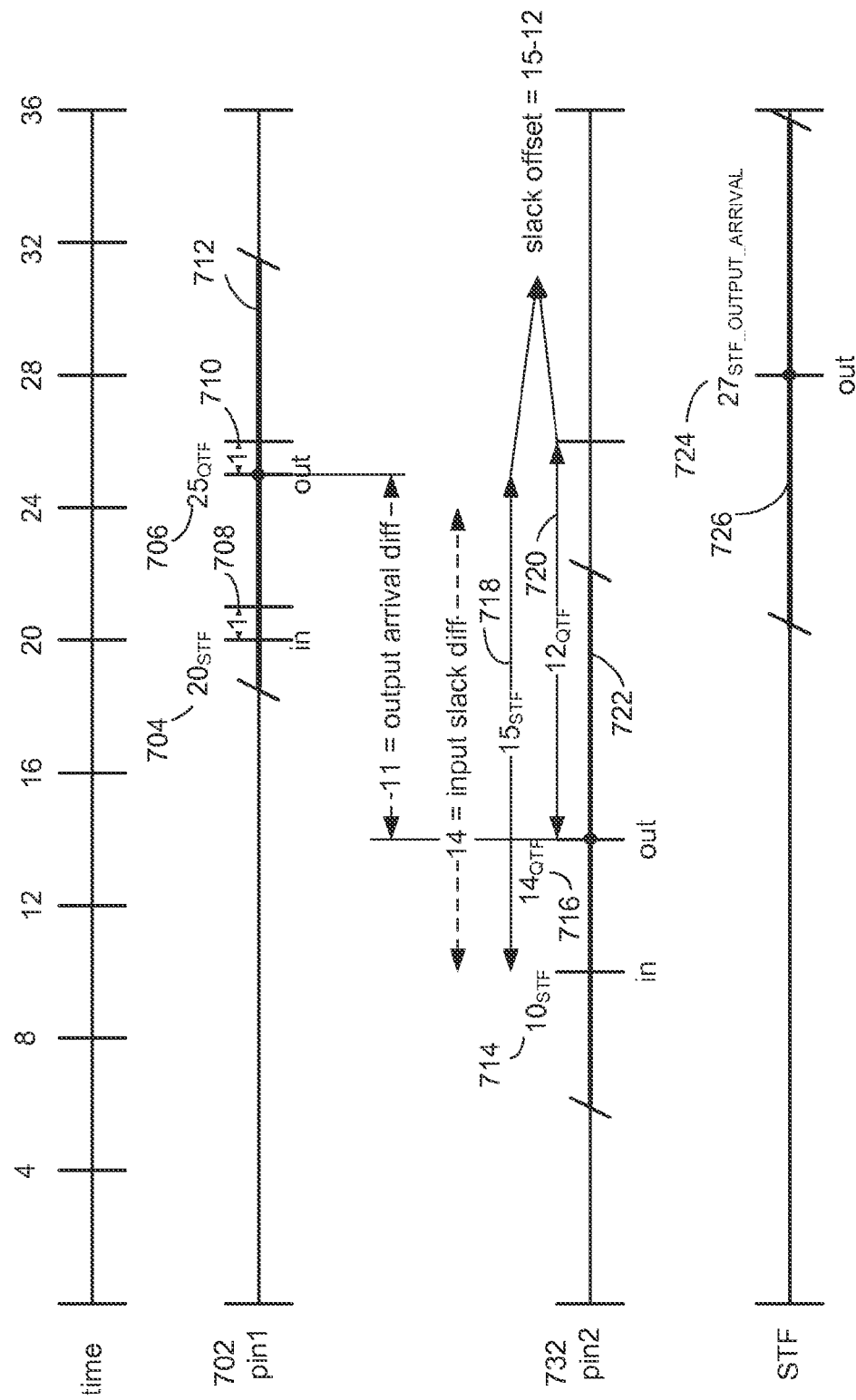
FIG. 7 illustrates an example single timing edge for setup timing through a gate arc and an example derivation of slack offset, according to one embodiment of the present invention.

FIG. 7 illustrates an example single timing edge for setup timing through a gate arc and an example derivation of slack offset, according to one embodiment of the present invention. The time units illustrated in FIG. 7 may be any feasible unit of time, such as nanoseconds or picoseconds. As shown in FIG. 7, timeline 702 for a gate arc starting from pin 1, a first gate input, depicts STF arrival time at the start of the gate-arc 704, QTF-computed arrival time at the end of the gate arc 706, STF slack time 708, QTF slack time 710, and QTF output transition time 712. Timeline 732 for a gate arc starting from pin 2, a second gate input, depicts STF arrival time 714, QTF-computed arrival time at the end of the gate-arc 716, STF slack time 718, QTF slack time 720, and QTF output transition time 722. The bottom timeline depicts STF output arrival time (at the end of the worst case gate arc) 724 and STF output transition time 726. Since the gate-arc starting from pin 2 results in the worst case QTF-computed transition time at the output, the QTF records the output transition time based on pin 2. Similarly, since pin 1 results in the worst case QTF-computed arrival time at the output, the QTF records the output arrival time based on pin 1. Various values derived from FIG. 7 are illustrated in Table 1 below:

TABLE 1

| | |
|---|---|
| STF-QTF error in output transition times (between 726 and 722) | 15-16 = –1 |
| STF-QTF error in output arrival times (between 724 and 706) | 27-25 = +2 |
| pin 2 QTF output arrival (716) | 14 |
| pin 1 QTF output arrival (706) | 25 |
| pin 2 QTF slack (720) | 12 |
| pin 1 QTF slack (710) | 1 |
| pin 2 STF slack (718) | 15 |
| pin 1 STF slack (708) | 1 |

From FIG. 7 and TABLE 1, the STF-QTF error in transition times (between 726 and 722) is 15–16=–1. The STF-QTF error in arrival times (between 724 and 706) is 27–25=+2. FIG. 7 further illustrates that pin 2's gate arc has a QTF output arrival that is 11 time units earlier than the QTF arrival of pin 1's gate arc and that pin 2 has a STF slack that is 14 time units better than the QTF slack of pin 1. Therefore, there is a slack offset of 15–12=3, the slack offset being the STF slack less the QTF slack of pin 2. Conceptually, the slack offset of 3 time units on pin 2 indicates that the slack is 3 time units better than would be expected based on arrivals alone. Typically, adding 11 to the output arrival time would cause pin 2 to become the worst path because the output arrival for pin 2 would then exceed that of pin 1. However, because of the better slack of pin 2, the pin 2 output arrival time would need to be increased by 14 units to become the worst case path, thereby accounting for the better slack. The difference of 3 is thus reported as the slack offset and is an indication that pin 2 likely has some special relaxed timing requirements compared to pin 1. For gates having even more than two pins, the same procedure is repeated for each additional pin.

For wire arcs, the arrival and transition values are computed at each load pin of the wire arc using QTF and then subtracted from the values reported by the STF timing table to get the corresponding arrival and transition error values. However, no "slack offset" is computed for a wire arc because there is typically only one driving pin on the wire arc, i.e., there are no additional pins for comparison between slack and arrival times.

Figure 8A:
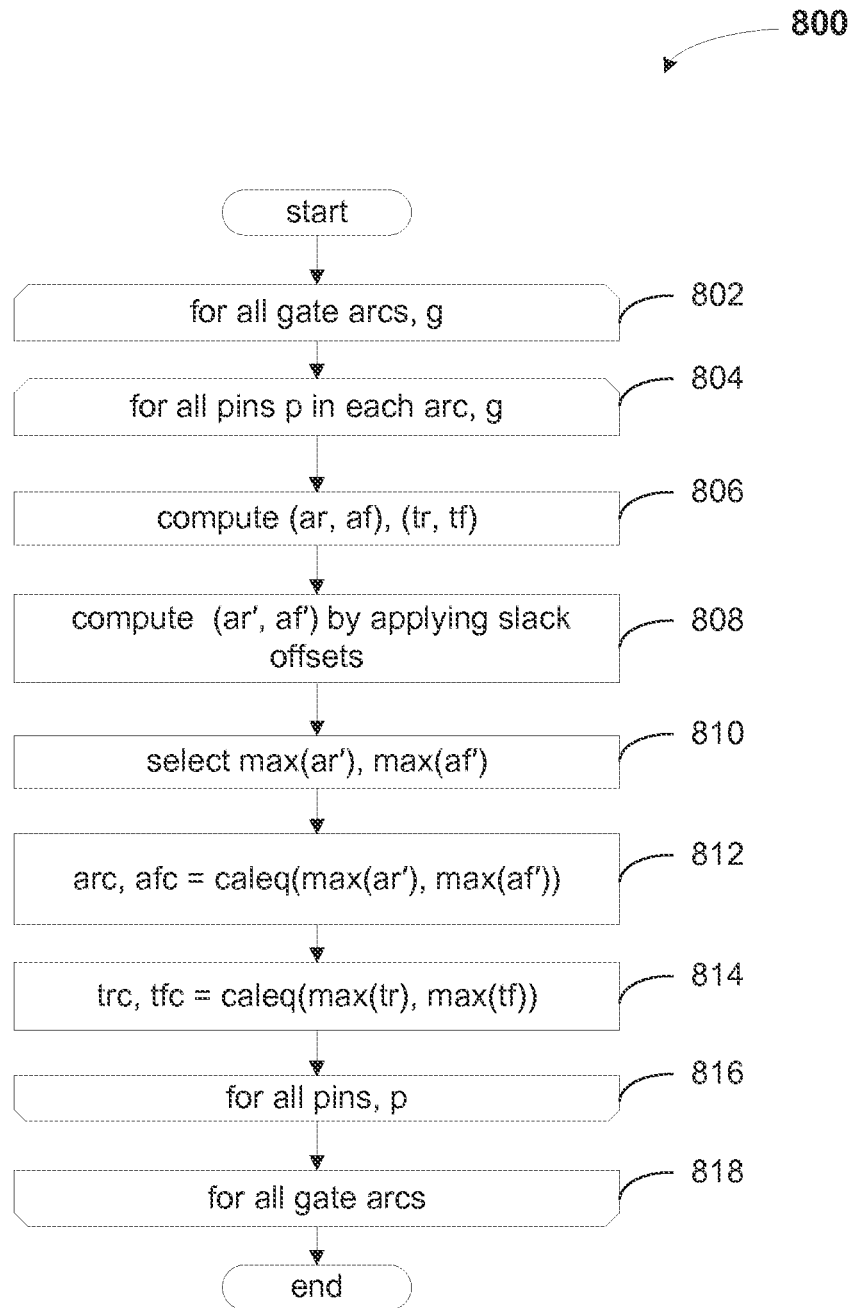
FIG. 8A is a flow diagram of method steps for updating timing parameters related to gate arcs after a circuit design change, according to one embodiment of the present invention.
Figure 8B:
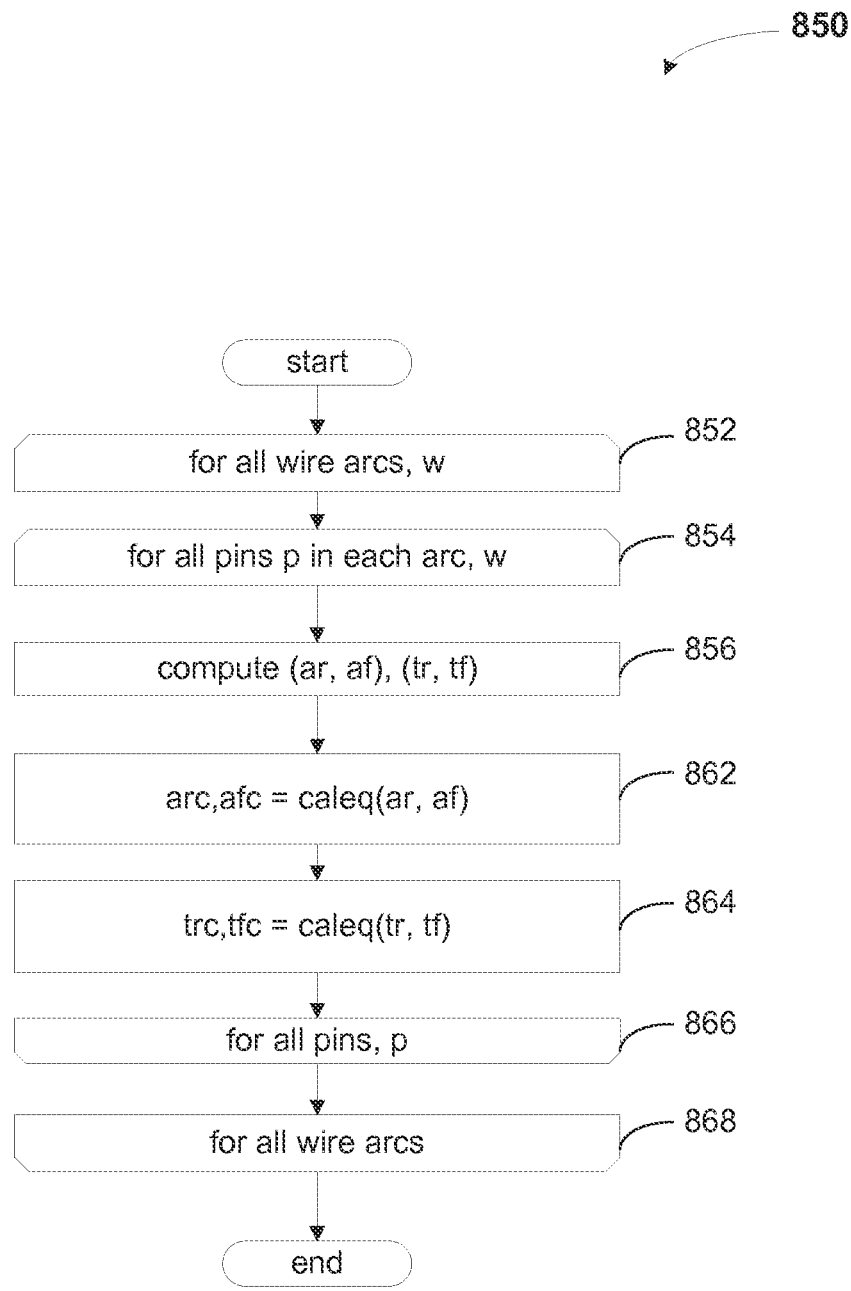
FIG. 8B is a flow diagram of method steps for updating timing parameters related to wire arcs after a circuit design change, according to one embodiment of the present invention.

FIGS. 8A and 8B illustrate steps in one embodiment for updating timing parameters, that is, the calibrated transition, arrival, and slack values, related to gate arcs and wire arcs after a circuit design change, according to one embodiment of the present invention.

FIG. 8A is a flow diagram of method steps for FIG. 8A is a flow diagram of method steps for updating timing parameters related to gate arcs after a circuit design change, according to one embodiment of the present invention, according to one embodiment of the present invention. Although the method steps are described in conjunction with the systems of FIGS. 1-7, persons skilled in the art will understand that any system configured to perform the method steps, in any order, is within the scope of the present invention.

As shown, at steps 802 and 818 of method 800, the intervening steps 804-816 are repeated for each gate arc 'g.' As also shown, at steps 804 and 816, the intervening steps 806-814 are repeated for each pin 'p' of a particular gate arc 'g.' At step 806, timing analysis application 210 computes rising and falling arrival times (ar, af) and rising and falling transition times (tr, tf) for each pin in the gate arc. At step 808, timing analysis application 210 applies the slack offset to each arrival time resulting in adjusted arrival times (ar', af'). For setup paths, the slack offset is subtracted; for hold paths, the slack offset is added. At step 810, timing analysis application 210 selects the worst rising arrival time (max (ar')) and worst falling arrival times (max(af')). At step 812, timing analysis application 210 applies a version of the calibration equation to the worst arrival times ($P_{Q2}$=max(ar') $P_{Q2}$=max(af')) to compute the calibrated QTF arrival times ($P_{Q2C}$=arc, $P_{Q2C}$=afc). This version of the calibration equation is given by Equation 4 below:

$$(P_{Q2C}-P_{Q2})/(P_{S1}-P_{Q1})=(T_{Q2}/T_{Q1})^Z \qquad \text{Eqn. 4}$$

The values from the calibration equation include values from the calibration table described above and from the results of FIG. 6. At step 814, timing analysis application 210 applies the calibration equation in a similar manner to the worst rising transition time (max(tr)) and worst falling transition time (max(tf)) to compute the calibrated QTF transition times ($P_{Q2C}$=trc, $P_{Q2C}$=tfc). After completing steps 806 through 814 for each pin 'p' of each gate arc 'g,' the method 800 then terminates.

Notably, in step 808, the modification of the arrival time using the slack offset has the effect of only modifying arrivals to output pins for cases where the downstream slack should actually change. For example, if a particular input pin of the driving gate has a relaxed timing constraint, then the inclusion of the slack offset prevents the process from increasing the worst case arrival at an output pin, until the worst case arrival is delayed enough to actually decrease the slack of the output pin, even with the relaxed constraint.

Updated timing parameters for a circuit change are propagated downstream, from arc to arc until a timing endpoint is reached or the magnitude of the change falls below a threshold value, which is set depending on the desired accuracy of the timing update. A useful measure of the overall timing impact of a circuit change is the maximum change in arrival times at the set of pins where the magnitudes of the transition changes fall below the threshold. Alternatively, in some embodiments, instead of having the process stop the downstream propagation of the changes when a threshold is reached, the process may alternatively propagate the change all the way to timing endpoints such as flip-flops, latches or RAMs, thereby fully updating the timing.

If a timing endpoint is reached, then the process computes the endpoint slack $S_{Q2C}$. This computation relates the difference between QTF and STF endpoint slack to the difference between pre- and post-change QTF timing constraints and QTF and STF arrival times, as shown in Equation 5 below:

$$(S_{Q2C}-S_{S1})=(C_{Q1}-C_{Q2})-D*(A_{Q2C}-A_{S1}) \qquad \text{Eqn. 5}$$

where ($S_{Q2C}-S_{S1}$) is the difference ($S_{Q2C}>S_{S1}$=improvement) in slack times with $S_{Q2C}$ being the calibrated QTF slack value after the change and $S_{S1}$ being the STF slack value before the change; ($A_{Q2C}-A_{S1}$) is the difference ($A_{Q2C}<A_{S1}$=earlier) in arrival times with $A_{Q2C}$ being the calibrated QTF arrival value after the change and $A_{S1}$ being the STF arrival value before the change; and ($C_{Q2}-C_{Q1}$) is the difference in timing constraints, with $C_{Q2}$ being the QTF value after the change and $C_{Q1}$ being the QTF value before the change. D=1 for setup timing checks and −1 for hold timing checks if the endpoint is a data capture pin, such as the data input of a flip-flop, latch, or RAM. Alternatively, if the endpoint is a clock pin, then D=−1 for setup timing checks and 1 for hold timing checks. Note, as in this example, the timing constraints may be entirely computed by the QTF, both before and after the change, based on its calculation of setup or hold constraints. The timing constraints are typically calculated using look-up tables from a cell library in a manner similar to transition and arrival calculations. Timing constraints are further described herein.

From Equation 5, an improvement in setup slack times ($S_{Q2C}>S_{S1}$) results from earlier ($A_{Q2C}<A_{S1}$) arrival times if the timing constraints did not change. In the case of hold slack times, later arrival times improve slack. An improvement in slack times also occurs if the constraints improve (become smaller) when the arrival times did not change. If the endpoint is a clock pin, then the change in arrival times should also be applied as a change in constraints at any data pins affected by the clock pin.

FIG. 8B is a flow diagram of method steps for FIG. 8A is a flow diagram of method steps for updating timing parameters related to wire arcs after a circuit design change, according to one embodiment of the present invention, according to one embodiment of the present invention. Although the method steps are described in conjunction with the systems of FIGS. 1-7, persons skilled in the art will understand that any system configured to perform the method steps, in any order, is within the scope of the present invention.

As shown, at steps 852 and 868 of method 850, the intervening steps 854-866 are repeated for each wire arc 'w.' As also shown, at steps 854 and 866, the intervening steps 856-864 are repeated for each pin 'p' of a particular wire arc 'w.' At step 856, timing analysis application 210 computes rising and falling arrival times and rising and falling transition times (tr, tf). At step 862, timing analysis application 210 applies the calibration equation to compute the calibrated QTF arrival times (arc, afc). The values from the calibration equation include values from the calibration table 502 described above and from the results from FIG. 6. At step 864, timing analysis application 210 applies the calibration equation in a similar manner to the worst rising and falling transition times to compute the calibrated QTF transition times (trc, tfc). After completing steps 856 through 854 for each pin 'p' of each wire arc 'w,' the method 850 then terminates.

In sum, the embodiments provide an approach for improving a quick timing analysis of a circuit with improved accuracy relative to conventional approaches. A calibration table is derived based on a given manufacturing process, where the table summarizes a relationship between the differences between a signoff timing flow (STF) and the quick timing flow (QTF) for a number of timing parameter categories. The calibration table and calibration equation are then applied to an initial design case in which the initial STF and QTF differences are available to obtain a calibrated QTF result. Preferably, the new slacks at the endpoints of the design are then computed to complete an updated timing analysis.

At least one advantage of the disclosed approach is that it provides a quick but accurate timing analysis that can be used by a designer to determine promising approaches to solving a timing problem in a design or to improve the performance of the design by increasing slacks, because while the incremental timing analysis is quick, such incremental timing analysis is also sufficiently accurate that it can be used in most cases instead re-running a lengthy signoff analysis. Another advantage of the disclosed approaches is that a designer can interactively test a set of design changes to determine an approach to solving a timing problem without having to endure executing a lengthy timing analysis, such as a signoff analysis, that may take days. As a result, the performance of a new VLSI design may be improved without significantly impacting the release schedule of the new VLSI design.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by a processor, cause the processor to update one or more timing parameters included in a plurality of timing parameters after a circuit design change associated with a very large scale integrated (VLSI) circuit, by performing the steps of:

prior to the circuit design change:
deriving a first value for a first timing parameter included in the plurality of timing parameters based on a signoff timing analysis of a timing arc included in a plurality of timing arcs associated with the VLSI circuit,
deriving a second value for a second timing parameter included in the plurality of timing parameters based on a first quick timing analysis of the timing arc, and obtaining a first transition time based on the first quick timing analysis; and after the circuit design change:

deriving a third value for a third timing parameter included in the plurality of timing parameters based on a second quick timing analysis of the timing arc, obtaining a second transition time based on the second quick timing analysis, deriving a fourth value for a fourth timing parameter included in the plurality of timing parameters based on the first timing parameter, the second timing parameter, the third timing parameter, the first transition time and the second transition time and generating a timing analysis for each timing arc included in the plurality of timing arcs associated with the VLSI circuit design based at least on the fourth timing parameter.

2. The computer-readable storage medium of claim 1, wherein the fourth timing parameter comprises a calibrated result of the quick timing analysis that closely matches a signoff analysis result related to the circuit design change, and the fourth timing parameter is related to an empirically derived parameter that is dependent on a particular manufacturing process.

3. The computer-readable storage medium of claim 1, wherein at least one of the first timing parameter and the second timing parameter comprises an arrival time or a transition time associated with the timing arc.

4. The computer-readable storage medium of claim 1, wherein the fourth timing parameter is further based on a first ratio of the second transition time to the first transition time, the first ratio raised to a power, and a difference between the second and first timing parameters.

5. The computer-readable storage medium of claim 1, wherein the circuit design includes a logic gate, a wire, and a first buffer along the wire; and wherein the circuit design change includes at least one of a change to a size of the logic gate, a placement of the logic gate, an addition of a second buffer along the wire, a removal of the first buffer, a removal of the second buffer and a change to a size of the wire.

6. The computer-readable storage medium of claim 1, wherein the circuit design includes at least one circuit element having at least one input pin and an output pin; and further including instructions that, when executed by a processor, cause the processor to perform the step of computing a slack time for the at least one input pin.

7. The computer-readable storage medium of claim 6, wherein the slack time is based on a slack offset value relative to an arrival difference value, the slack offset value being a difference between a computed slack time and a slack time obtained from the signoff analysis, and the arrival time difference value being a difference between a first arrival time obtained from the signoff analysis and a second arrival time obtained from the quick timing analysis.

8. The computer-readable storage medium of claim 6, wherein the circuit element comprises a first input pin and a second input pin, wherein each of the first input pin and the second input pin is associated with a different arrival time and a different slack time; and further including instructions that, when executed by a processor, cause the processor to perform the step of computing a slack offset based on a first difference between a slack time related to the first input pin and a slack time related to the output pin and on a second difference between a slack time related to the second input pin and the slack time related to the output pin.

9. The computer-readable storage medium of claim 1, wherein the timing arc is included in a plurality of timing arcs, and further including instructions that, when executed by a processor, cause the processor to perform the step of propagating an update caused by a difference between the fourth timing parameter and the third timing parameter to one or more other timing arcs included in the plurality of timing arcs.

10. The computer-readable storage medium of claim 9, wherein propagating the update to the one or more other timing arcs stops when a magnitude of the update falls below a threshold value.

11. The computer-readable storage medium of claim 9, wherein propagating the update to the one or more other timing arcs stops when a timing endpoint is reached.

12. A method performed by a computer for updating one or more timing parameters included in a plurality of timing parameters after a circuit design change associated with a very large scale integrated (VLSI) circuit, the method comprising:

prior to the circuit design change:

deriving a first value for a first timing parameter included in the plurality of timing parameters based on a signoff timing analysis of a timing arc, deriving a second value for a second timing parameter included in the plurality of timing parameters based on a first quick timing analysis of the timing arc, and obtaining a first transition time based on the first quick timing analysis; and after the circuit design change:

deriving a third value for a third timing parameter included in the plurality of timing parameters based on a second quick timing analysis of the timing arc, obtaining a second transition time based on the second quick timing analysis, deriving, via a processor, a fourth value for a fourth timing parameter included in the plurality of timing parameters based on the first timing parameter, the second timing parameter, the third timing parameter, the first transition time and the second transition time, and generating a timing analysis for each timing arc included in the plurality of timing arcs associated with the VLSI circuit design based at least on the fourth timing parameter.

13. The method of claim 12, wherein the fourth timing parameter is further based on a first ratio of the second transition time to the first transition time, the first ratio raised to a power, and a difference between the second and first timing parameters.

14. The method of claim 12, wherein the circuit design includes at least one circuit element having at least one input pin and an output pin; and further comprising computing a slack time for the at least one input pin.

15. The method of claim 14, wherein the slack time is based on a slack offset value relative to an arrival difference value, the slack offset value being a difference between a computed slack time and a slack time obtained from the signoff analysis, and the arrival time difference value being a difference between a first arrival time obtained from the signoff analysis and a second arrival time obtained from the quick timing analysis.

16. A timing analysis system, comprising:

a memory storing a timing analysis application; and a processor coupled to the memory, wherein, when executed by the processor, the timing analysis application configures the processor to:

prior to the circuit design change:
- deriving a first value for a first timing parameter included in the plurality of timing parameters based on a signoff timing analysis of a first timing arc,
- deriving a second value for a second timing parameter included in the plurality of timing parameters based on a first quick timing analysis of the first timing arc, and
- obtaining a first transition time based on the first quick timing analysis; and after the circuit design change:
- deriving a third value for a third timing parameter included in the plurality of timing parameters based on a second quick timing analysis of a second timing arc,
- obtaining a second transition time based on the second quick timing analysis,
- deriving a fourth value for a fourth timing parameter included in the plurality of timing parameters based on the first timing parameter, the second timing parameter, the third timing parameter, the first transition time and the second transition time, and
- generating a timing analysis for each timing arc included in the plurality of timing arcs associated with the VLSI circuit design based at least on the fourth timing parameter.

17. The timing analysis system of claim 16, wherein the fourth timing parameter is further based on a first ratio of the second transition time to the first transition time, the first ratio raised to a power, and a difference between the second and first timing parameters.

18. The timing analysis system of claim 16, wherein at least one of the first timing parameter and the second timing parameter comprises an arrival time or a transition time associated with the first timing arc.

19. The timing analysis system of claim 16, wherein the circuit design includes at least one circuit element having at least one input pin and an output pin; and wherein, when executed by the processor, the timing analysis application further configures the processor to compute a slack time for the at least one input pin.

20. The timing analysis system of claim 19, wherein the slack time is based on a slack offset value relative to an arrival difference value, the slack offset value being a difference between a computed slack time and a slack time obtained from the signoff analysis, and the arrival time difference value being a difference between a first arrival time obtained from the signoff analysis and a second arrival time obtained from the quick timing analysis.

21. The timing analysis system of claim 16, wherein the first timing arc and the second timing arc are the same.

* * * * *